United States Patent
Chew

(10) Patent No.: US 11,334,300 B2
(45) Date of Patent: May 17, 2022

(54) NON-TRANSITORY STORAGE MEDIUM STORING PROGRAM READABLE BY COMPUTER OF INFORMATION PROCESSING APPARATUS, NON-TRANSITORY STORAGE MEDIUM STORING PROGRAM SET, AND INFORMATION PROCESSING APPARATUS

(71) Applicant: Brother Kogyo Kabushiki Kaisha, Nagoya (JP)

(72) Inventor: Po Chun Chew, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/238,586

(22) Filed: Apr. 23, 2021

(65) Prior Publication Data
US 2021/0342105 A1  Nov. 4, 2021

(30) Foreign Application Priority Data

Apr. 30, 2020 (JP) .............................. JP2020-079960

(51) Int. Cl.
| | |
|---|---|
| *G06F 15/00* | (2006.01) |
| *G06F 3/12* | (2006.01) |
| *G06K 1/00* | (2006.01) |
| *H04W 76/10* | (2018.01) |

(52) U.S. Cl.
CPC .......... *G06F 3/1225* (2013.01); *G06F 3/1203* (2013.01); *G06F 3/1236* (2013.01); *G06F 3/1292* (2013.01); *H04W 76/10* (2018.02)

(58) Field of Classification Search
CPC .... G06F 3/1225; G06F 3/1203; G06F 3/1236; G06F 3/1292; H04W 76/10
USPC ............................... 358/1.15, 1.14, 1.13, 1.1
See application file for complete search history.

(56) References Cited

U.S. PATENT DOCUMENTS

| | | | |
|---|---|---|---|
| 2015/0081845 A1* | 3/2015 | Arai ....................... | G06F 3/1275 709/218 |
| 2020/0090015 A1* | 3/2020 | Fujimoto ............ | H04N 1/32128 |
| 2021/0096795 A1* | 4/2021 | Chew .................... | G06F 3/1204 |

FOREIGN PATENT DOCUMENTS

JP         2013-105361 A      5/2013

* cited by examiner

*Primary Examiner* — Douglas Q Tran
(74) *Attorney, Agent, or Firm* — Burr & Brown, PLLC

(57) ABSTRACT

A non-transitory storage medium stores a program readable by a computer of an information processing apparatus. When executed by the computer, the program causes the information processing apparatus to execute: (a) in response to receipt of an establishing instruction, obtaining processing of obtaining device information of at least one connectable device which is a device capable of connecting to the information processing apparatus, (b) specifying processing of specifying a particular device to which the wireless communication is established based on the obtained device information, and (c) instruction processing of instructing an operating system of the information processing apparatus to execute pairing with the particular device. The operating system establishes wireless communication based on a prescribed wireless communication protocol with the particular device in response to receipt of an instruction for the pairing.

10 Claims, 7 Drawing Sheets

FIG.2A

BT DEVICE INFORMATION

DEVICE ID | ABC1234

BT ADDRESS | a0:66:10:96:08:49

⋮

BT SERVICE

・SPP | AVAILABLE

FIG.2B

| PRINT QUEUE | PRINT PORT | PRINTER DRIVER | PRINT SETTING |
|---|---|---|---|
| QUEUE A | PRINT PORT A | DRIVER A | SETTING A |
| QUEUE B | PRINT PORT B | DRIVER B | SETTING B |
|  |  |  |  |

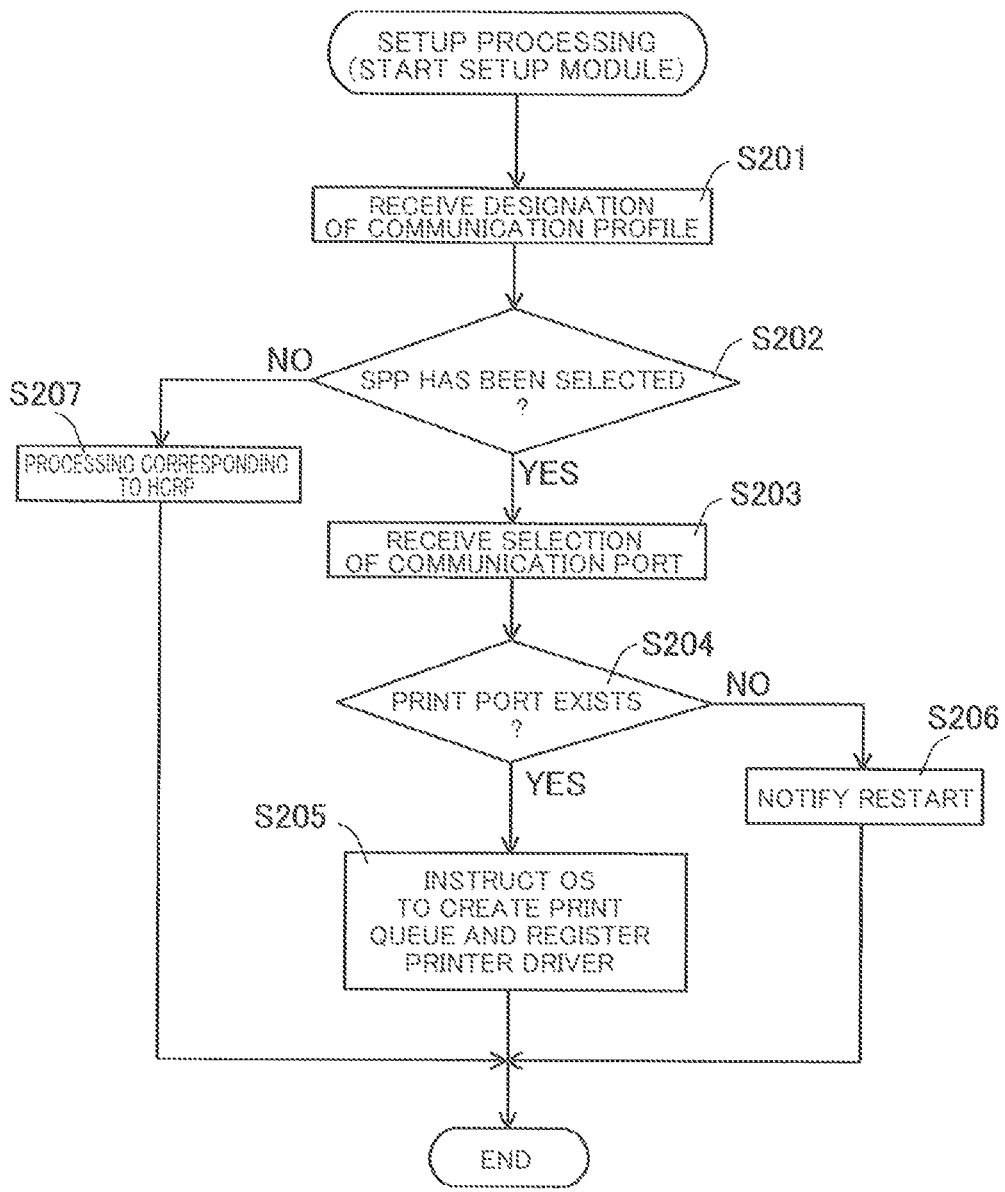

NON-TRANSITORY STORAGE MEDIUM STORING PROGRAM READABLE BY COMPUTER OF INFORMATION PROCESSING APPARATUS, NON-TRANSITORY STORAGE MEDIUM STORING PROGRAM SET, AND INFORMATION PROCESSING APPARATUS

CROSS REFERENCE TO RELATED APPLICATION

The present application claims priority from Japanese Patent Application No. 2020-079960, which was filed on Apr. 30, 2020, the disclosure of which is herein incorporated by reference in its entirety.

BACKGROUND

A technical field disclosed in the specification relates to a technique of setup necessary for an information processing apparatus to execute wireless communication with a device.

There has been known a technique relating to the setup necessary for the information processing apparatus to execute wireless communication with the device. For example, a conventional information processing apparatus has an installer for installing a printer driver on the information processing apparatus, and the information processing apparatus is a configuration in which setting information relating to a previously designated communication port is written in a registry as a database included in an operating system.

SUMMARY

For example, when software installed on the information processing apparatus executes wireless communication with a device, the device is associated with a communication port set in an operating system of the information processing apparatus, and the communication port with which the device is associated is used by the software. Before using the device, processing for properly associating the device with the communication port is required to be executed by the software using the device or an installer of the software; however, a design load of the processing is high. The conventional information processing apparatus does not have a method for solving the above problem.

An aspect of the disclosure relates to a technique for reducing the design load in a program of executing setup necessary for wireless communication between the information processing apparatus and the device.

In one aspect of the disclosure, a non-transitory storage medium stores a program readable by a computer of an information processing apparatus. When executed by the computer, the program causes the information processing apparatus to execute: (a) in response to receipt of an establishing instruction, obtaining processing of obtaining device information of at least one connectable device which is a device capable of connecting to the information processing apparatus, the establishing instruction being an instruction for establishing wireless communication based on a prescribed wireless communication protocol from software incorporated in the information processing apparatus, the at least one connectable device being capable of establishing wireless communication based on the prescribed wireless communication protocol, (b) specifying processing of specifying a particular device, of the at least one connectable device, to which the wireless communication is established based on the obtained device information, and (c) instruction processing of instructing an operating system of the information processing apparatus to execute pairing with the particular device, the operating system establishing the wireless communication based on the prescribed wireless communication protocol with the particular device in response to receipt of an instruction for the pairing, the operating system associating the particular device with one of a plurality of communication ports provided in the operating system for respectively communicating with a plurality of devices through a communication interface of the information processing apparatus in response to establishment of the wireless communication with the particular device.

In another aspect of the disclosure, a non-transitory storage medium stores a program set readable by a computer of an information processing apparatus. The program set includes a first module and a second module. When executed by the computer, the first module causes the information processing apparatus to execute: (a) in response to receipt of an establishing instruction, obtaining processing of obtaining device information of at least one connectable device which is a device capable of connecting to the information processing apparatus, the establishing instruction being an instruction for establishing wireless communication based on a prescribed wireless communication protocol from software incorporated in the information processing apparatus, the at least one connectable device being capable of establishing wireless communication based on the prescribed wireless communication protocol, (b) specifying processing of specifying a particular device, of the at least one connectable device, to which the wireless communication is established based on the obtained device information, and (c) instruction processing of instructing an operating system of the information processing apparatus to execute pairing with the particular device, the operating system establishing the wireless communication based on the prescribed wireless communication protocol with the particular device in response to receipt of an instruction for the pairing, the operating system associating the particular device with one of a plurality of communication ports provided in the operating system for respectively communicating with a plurality of devices through a communication interface of the information processing apparatus in response to establishment of the wireless communication with the particular device. When executed by the computer, the second module causes the information processing apparatus to execute setup processing of creating a device queue for the information processing apparatus that communicates with the particular device, the created device queue being associated with a particular port as a communication port associated with the particular device, the information processing apparatus communicating with the particular device by using the device queue.

In another aspect of the disclosure, an information processing apparatus comprises a communication interface and a computer. The computer executes: (a) in response to receipt of an establishing instruction, obtaining processing of obtaining device information of at least one connectable device which is a device capable of connecting to the information processing apparatus, the establishing instruction being an instruction for establishing wireless communication based on a prescribed wireless communication protocol from software incorporated in the information processing apparatus, the at least one connectable device being capable of establishing wireless communication based on the prescribed wireless communication protocol, (b)

specifying processing of specifying a particular device, of the at least one connectable device, to which the wireless communication is established based on the obtained device information, and (c) instruction processing of instructing an operating system of the information processing apparatus to execute pairing with the particular device, the operating system establishing the wireless communication based on the prescribed wireless communication protocol with the particular device in response to receipt of an instruction for the pairing, the operating system associating the particular device with one of a plurality of communication ports provided in the operating system for respectively communicating with a plurality of devices through a communication interface of the information processing apparatus in response to establishment of the wireless communication with the particular device.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 2A illustrates an example of device information stored in a BT device DB;

FIG. 2B is an explanatory chart illustrating an example of information stored in a print queue;

FIG. 8 is a flowchart illustrating a procedure of setup processing.

EMBODIMENTS

Hereinafter, an embodiment embodying a program will be explained in detail with reference to the attached drawings. The embodiment discloses the program executed in a personal computer (hereinafter referred to as "PC").

A PC 1 according to the embodiment is an apparatus connectable to a printer 2 as a device having a function of printing an image and capable of executing various application programs (hereinafter referred to as "applications") for allowing the printer 2 to execute functions of printing and the like. The PC 1 is an example of an information processing apparatus. For example, a smartphone or a tablet computer may be used instead of the PC 1.

The printer 2 is a device having at least the print function and a communication function. The printer 2 is an example of a particular device. The printer 2 according to the embodiment has at least an interface (hereinafter referred to as "BT-IF") 21 for executing communication by a communication protocol in a Bluetooth (registered trademark, hereinafter referred to as "BT") mode, and an interface (hereinafter referred to as "USB-IF") 22 for executing communication in a USB mode as the communication function. BT communication is a communication standard for 1-to-1 wireless connection. The BT communication is an example of a prescribed wireless communication protocol.

A plurality of communication profiles are prepared in the BT communication, and it is necessary that devices configured to communicate with each other conform to the same communication profile for executing proper communication. The printer 2 according to the embodiment conforms to at least SPP (an abbreviation of Serial Port Profile) as the communication profile of the BT communication, and may conform also to other communication profiles such as HCRP (an abbreviation of Hardcopy Cable Replacement Profile). The printer 2 according to the embodiment may further have communication functions in communication modes other than the BT mode and the USB mode, for example, a communication function in a Wi-Fi (registered trademark) mode.

Figure 1:
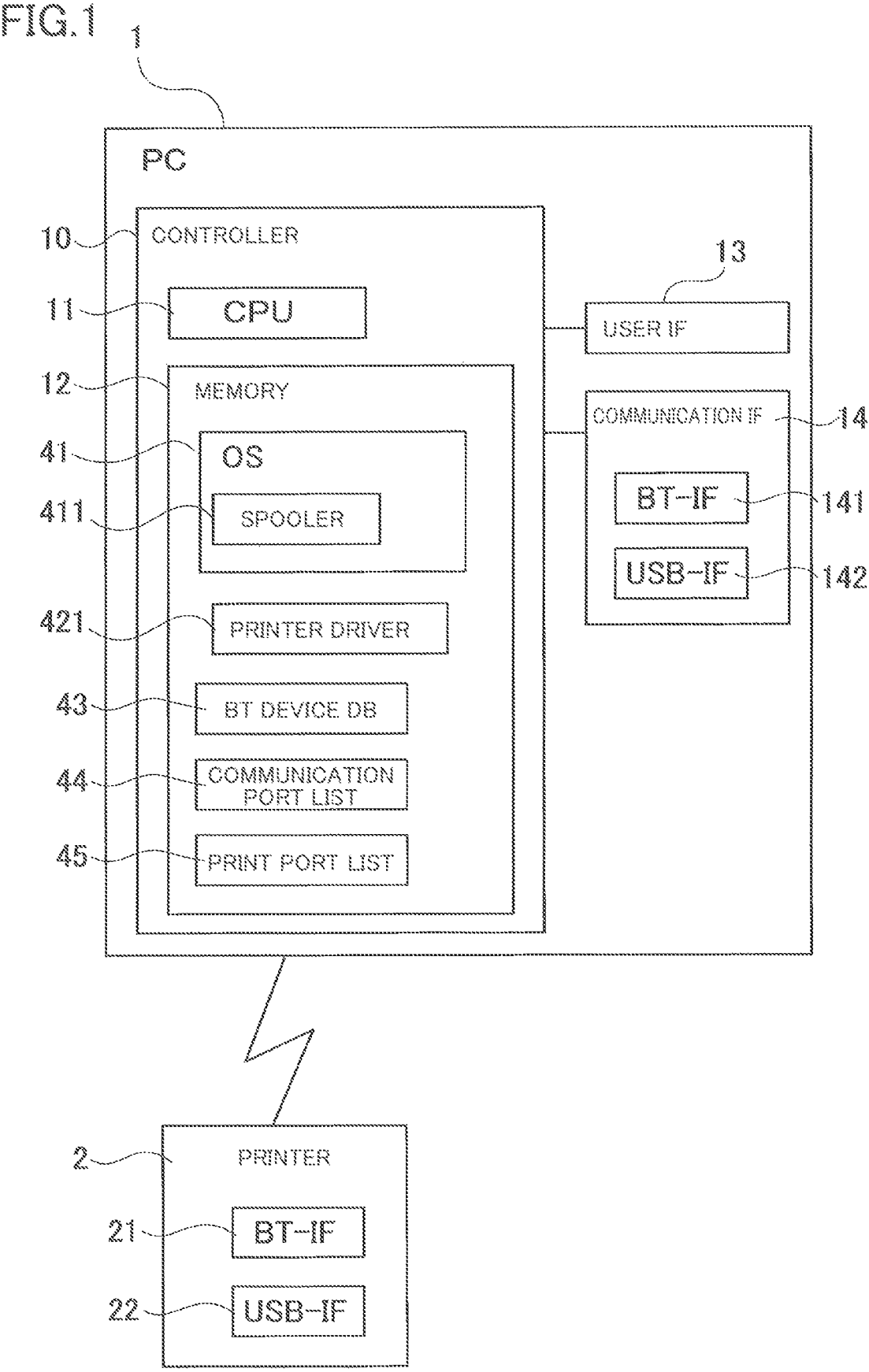
FIG. 1 is a schematic configuration diagram of a PC according to an embodiment.

The PC 1 according to the embodiment includes a controller 10 having a CPU 11 and a memory 12 as illustrated in FIG. 1. The CPU 11 is an example of a computer. The PC 1 also includes a user interface (hereinafter referred to as "user IF") 13 and a communication interface (hereinafter referred to as "communication IF") 14, and the user interface 13 and the communication interface 14 are electrically connected to the controller 10. The controller 10 in FIG. 1 is a general term used when hardware and software used for controlling the PC 1 or the like are collectively called, which does not always represent single hardware actually existing in the PC 1 or the like.

The CPU 11 executes various processing in accordance with programs read out from the memory 12 or based on operations by a user. The memory 12 is, for example, a ROM, a RAM, an HDD, or a flash memory, which is a storage area storing various programs such as a starting program for starting the PC 1, and various data such as image data, document data, and various setting information. The memory 12 is used also as a work area at the time of executing various processing. A buffer provided in the CPU 11 is also an example of the memory.

Examples of the memory 12 are not limited to the HDD and the like included in the PC 1 but may be storage media readable and writable by the CPU 11. The storage media readable by the computer are non-transitory media. The non-transitory media include recording media such as a CD-ROM and a DVD-ROM in addition to the above examples. The non-transitory media are also tangible media. On the other hand, an electrical signal configured to carry programs downloaded from a server or the like on Internet is a signal medium readable by the computer, and the electrical signal is a kind of media readable by the computer; however, the signal medium is not included in the non-transitory storage media readable by the computer.

The user IF 13 includes hardware configured to display information on a screen and hardware configured to receive input operations by the user. The user IF 13 may be a combination of a display for executing display and a keyboard or a mouse, or may be a touch panel having a display function and an input receiving function.

The communication IF 14 includes hardware for communicating with external devices such as the printer 2. The PC 1 according to the embodiment includes at least an BT-IF 141 and a USB-IF 142 as the communication IF 14. The communication IF 14 may include IFs conforming to further other communication modes such as Ethernet (registered trademark), and Wi-Fi (registered trademark).

In the memory 12 of the PC 1, an operating system (hereinafter referred to as "OS") 41, a printer driver 421, a BT device information database (hereinafter referred to as "BT device DB") 43, a communication port list 44, and a print port list 45 are incorporated as illustrated in FIG. 1. The OS 41 is, for example, Windows (registered trademark), mac OS (registered trademark), iOS (registered trademark), Android (registered trademark), or Linux (registered trademark). A spooler 411 is included in the OS 41. The spooler 411 manages transmission of print data to the device having the print function such as the printer 2.

The printer driver 421 generates, for example, print data for making the printer 2 execute printing in cooperation with the OS 41. The BT device DB 43 stores device information of respective BT devices in which pairing with the PC 1 has been completed and registered in the OS 41 as available devices using the BT communication. In the BT device DB 43, for example, information including a device ID as information for identifying the device and a BT address as address information used for the BT communication is stored as device information as illustrated in FIG. 2A.

The communication port list 44 is a list in which a plurality of communication ports used by the PC 1 for communicating with external devices by using the communication IF 14 are set. The print port list 45 is a list of communication ports used in the spooler 411 for causing the printer 2 or the like to execute printing.

The device registered in the BT device DB 43 are respectively associated with the communication ports by the communication port list 44. The communication ports with which the devices are associated are registered also in the print port list 45. When the communication port registered in the print port list 45 is further associated with a print queue, the application installed on the PC 1 is able to instruct printing by designating the print queue. For example, information such as a print port, the printer driver and print setting is stored so as to be associated with the print queue as illustrated in FIG. 2B. The printer driver associated with the print queue instructed to print allows the device associated with the communication port to execute printing through the communication port associated with the print queue.

Specifically, the application instructs the OS 41 to execute printing by designating the print queue and passing image data to the OS 41. The OS 41 instructed to execute print starts the printer driver 421 associated with the print queue and passes the image data to be printed to the printer driver 421. The printer driver 421 generates print data corresponding to the printer 2 based on the image data received from the OS 41 and passes the generated print data to the OS 41. The OS 41 passes the received print data to the print queue. The spooler 411 transmits the print data accumulated in the print queue to the printer 2 through the print port corresponding to the print queue, namely, through the communication IF with which the print port is associated. Accordingly, printed matter obtained based on the image data is created by the printer 2.

Figure 3A:
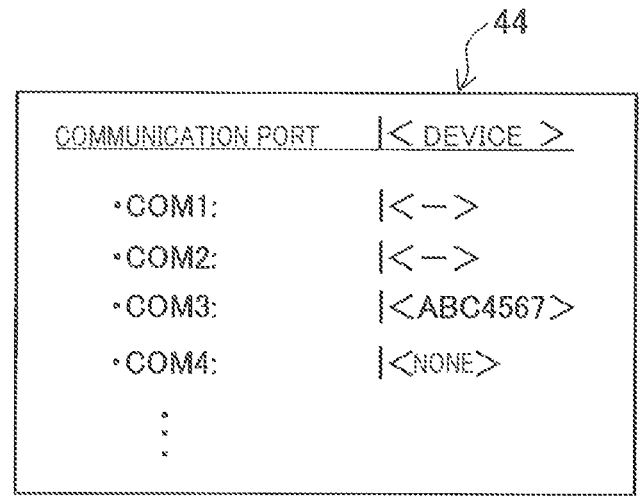
FIG. 3A is an explanatory view illustrating an example of configurations of communication ports.
Figure 3B:
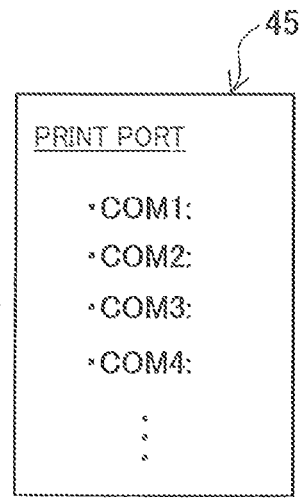
FIG. 3B is an explanatory view illustrating an example of configurations of print ports.

In the OS 41 according to the embodiment, a plurality of COM ports are prepared in advance in the communication port list 44 and the plurality of COM ports are registered in the communication port list 44, for example, as a COM1 port, a COM2 port, and so on as illustrated in FIG. 3A. Moreover, in the OS 41 according to the embodiment, a plurality of print ports having the same names respectively corresponding to the plurality of COM ports are provided in advance and the plurality of prints ports are registered in the print port list 45, for example, as illustrated in FIG. 3B. In the configuration, selection of the print port can be replaced with selection of the communication port. Each of the plurality of print ports is preferably associated with a corresponding one of the plurality of communication ports, and correspondence therebetween is not always based on names of the plurality of ports. For example, when an identification number is given to each of the plurality of communication ports, a corresponding one of the plurality of print ports may be associated with based on the identification number.

Figure 4:
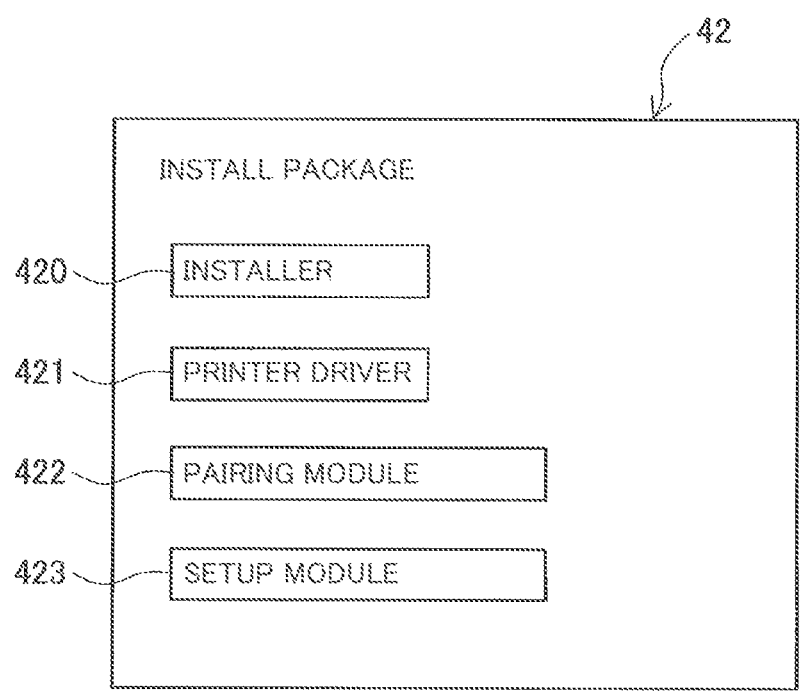
FIG. 4 is an explanatory view illustrating an example of a configuration of an install package.

FIG. 1 is a diagram illustrating a state after installation of the printer driver 421 and setup thereof have been completed, and the PC 1 and the printer 2 are connected by the BT communication. A program for installing the printer driver 421 on the PC 1 and executing the setup thereof is provided by an install package 42, for example, as illustrated in FIG. 4. The install package 42 includes an installer 420, the printer driver 421, a pairing module 422, and a setup module 423. The install package 42 may be provided by, for example, a CD and a DVD or may be prepared at a server or the like in a mode capable of being downloaded by the PC 1.

The installer 420 is a program for incorporating the printer driver 421 in the PC 1 and completing the setup. The installer 420 executes execution instructions to the pairing module 422 and the setup module 423. The installer 420 is an example of software, and the installer 420 is an upper program of the pairing module 422 and the setup module 423. The install package 42 may include not only the printer driver 421 for a model of the printer 2 but also a printer driver for another model and a scanner driver.

The pairing module 422 is a module executing pairing processing which is processing for establishing the BT communication between the device such as the printer 2 and the PC 1. The setup module 423 is a module configured to execute setup processing which is processing for enabling transmission of print data, through the printer driver 421, to the device, pairing with which has been executed. The pairing module 422 is an example of a program, and an example of a first module. The setup module 423 is an example of a second module. A pair of the pairing module 422 and the setup module 423 is an example of a program set.

Figure 5:
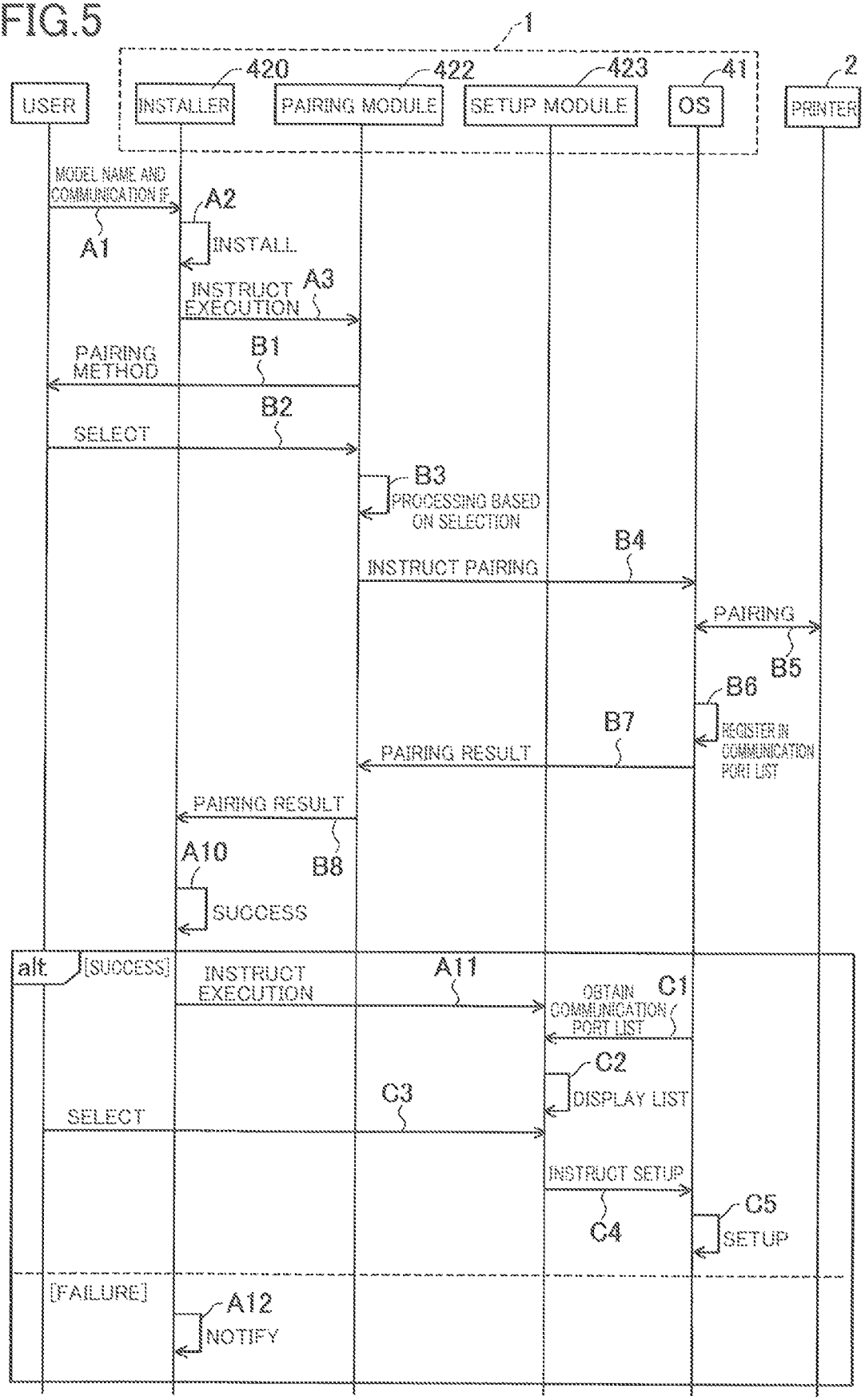
FIG. 5 is a sequence diagram illustrating an outline of an installer procedure.

Next, an outline of a procedure of installing the printer driver 421 by the installer 420 according to the embodiment and executing setup for instructing the printer 2 to execute printing from the printer driver 421 will be explained with reference to a sequence diagram of FIG. 5. The procedure illustrated in FIG. 5 is started when respective programs included in the install package 42 are read by the PC 1 and an execution instruction to the installer 420 is received.

The installer 420 causes the user to select a model name of the printer 2 and a type of the communication IF used for connection between the printer 2 and the PC 1 (A1). Explanation will be made on the assumption that the BT-IF has been selected as the communication IF in the following description.

The installer 420 installs the printer driver 421 conforming to the selected model name in the PC 1 (A2). The installer 420 further instructs the pairing module 422 to execute pairing processing (A3).

The pairing module 422 receives selection of a pairing method when receiving the execution instruction for the pairing processing from the installer 420 (B1). The pairing module 422 according to the embodiment includes a plurality of pairing methods as methods for specifying a device to be paired, and the pairing module 422 receives selection by the user from the plurality of methods (B2). Then, the pairing module 422 executes processing of pairing based on the selected method (B3). Types of pairing methods and details of respective processing contents will be described later.

The pairing module 422 passes an instruction, to the OS 41, for executing pairing with the printer 2, specifically, an instruction for pairing by designating the device or an instruction for adding the device (B4). The OS 41 executes the BT communication with the printer 2 when receiving the instruction from the pairing module 422 and executes processing for executing pairing (B5). When the pairing with the printer 2 is completed, the OS 41 registers device information of the printer 2 in the BT device DB 43 and registers the printer 2 in the communication port list 44 (B6).

Furthermore, the OS 41 passes information indicating pairing result to the pairing module 422 (B7). Information indicating the pairing result is information indicating whether the pairing has succeeded or not. That is, the pairing module 422 obtains information indicating the pairing result from the OS 41. The pairing module 422 passes the information indicating the pairing result to the installer 420 based on information received from the OS 41 (B8).

The installer 420 determines whether the pairing has succeeded or not based on the information received from the pairing module (A10). When it is determined that the pairing has succeeded (success), the installer 420 instructs the setup module 423 to execute the setup processing (A11). On the other hand, when it is determined that the pairing has failed (failure), the installer 420 causes the setup module 423 not to execute the setup processing, and the installer 420 notifies the failure (A12). The installer 420 may receive, for example, retry of the pairing depending on the reason why the pairing has failed.

The setup module 423, when instructed to execute the setup processing from the installer 420, for example, obtains a port name of each of the plurality of communication ports registered in the communication port list 44 (C1), and the setup module 423 displays them in a list (C2). The setup module 423 receives selection of the communication port through the user IF 13 (C3). When the communication port is selected by the selection by the user, the setup module 423 determines the print port corresponding to the communication port as the print port to be set up. The setup module 423 may receive selection of the print port by displaying a list of print ports.

When the print port is determined, the setup module 423 passes, to the OS 41, an instruction of setup for allowing the print port to be used by the printer driver 421 (C4). Specifically, the setup module 423 instructs the OS 41 to create the print queue corresponding to the printer 2 so as to be associated with the selected print port and to register the printer driver 421 so as to be associated with the created print queue. The print queue is an example of a device queue and the selected print port is an example of a particular port.

The OS 41 executes setup by creating the print queue corresponding to the designated print port and registering the printer driver 421 so as to be associated with the created print queue based on the instruction of the setup module 423 (C5).

Next, procedures of the pairing processing by the pairing module 422 and the setup processing by the setup module 423 will be explained with reference to flowcharts. The following processing and respective processing steps of the flowcharts basically indicate processing of the CPU 11 following commands described in programs. That is, processing such as "to decide", "to extract", "to select", "to calculate", "to determine", "to specify", "to obtain", "to receive", and "to control" in the following explanation indicates processing of the CPU 11. The processing by the CPU 11 also includes hardware control using an API of the OS in the PC 1. In the specification, the description of the OS may be omitted and operations of respective programs will be explained. That is, a description saying that "a program B controls hardware C" may indicate that "the program B controls hardware C by using the API of the OS" in the following explanation. Moreover, processing of the CPU 11 following commands described in the program is described in simplified wording in some cases. For example, the description will be made such as "the CPU 11 executes . . . ". Furthermore, processing of the CPU 11 following commands described in the program is described in wording in which the CPU is omitted such as "the program A executes . . . " in some cases.

Note that "to obtain" will be used in a concept that the request is not essential. That is, processing of receiving data without being requested by the CPU 11 is also included in a concept that "the CPU 11 obtains data". "Data" in the specification is represented by a bit string readable by the computer. Then, data having substantially the same contents in a different format will be dealt with as the identical data. The same applies to "information" in the specification. Moreover, "to request" and "to instruct" are concepts that information indicating the request and information indicating the instruction are outputted to the other party. The information indicating the request and the information indicating instruction may be written merely as "request" and "instruction".

Furthermore, processing of determining whether information A indicates that it is a matter B by the CPU 11 may be conceptually described such as "whether it is the matter B or not is determined from the information A". Processing of determining whether information A indicates that it is a matter B or a matter C may be conceptually described such as "whether it is the matter B or the matter C is determined from the information A".

Figure 6:
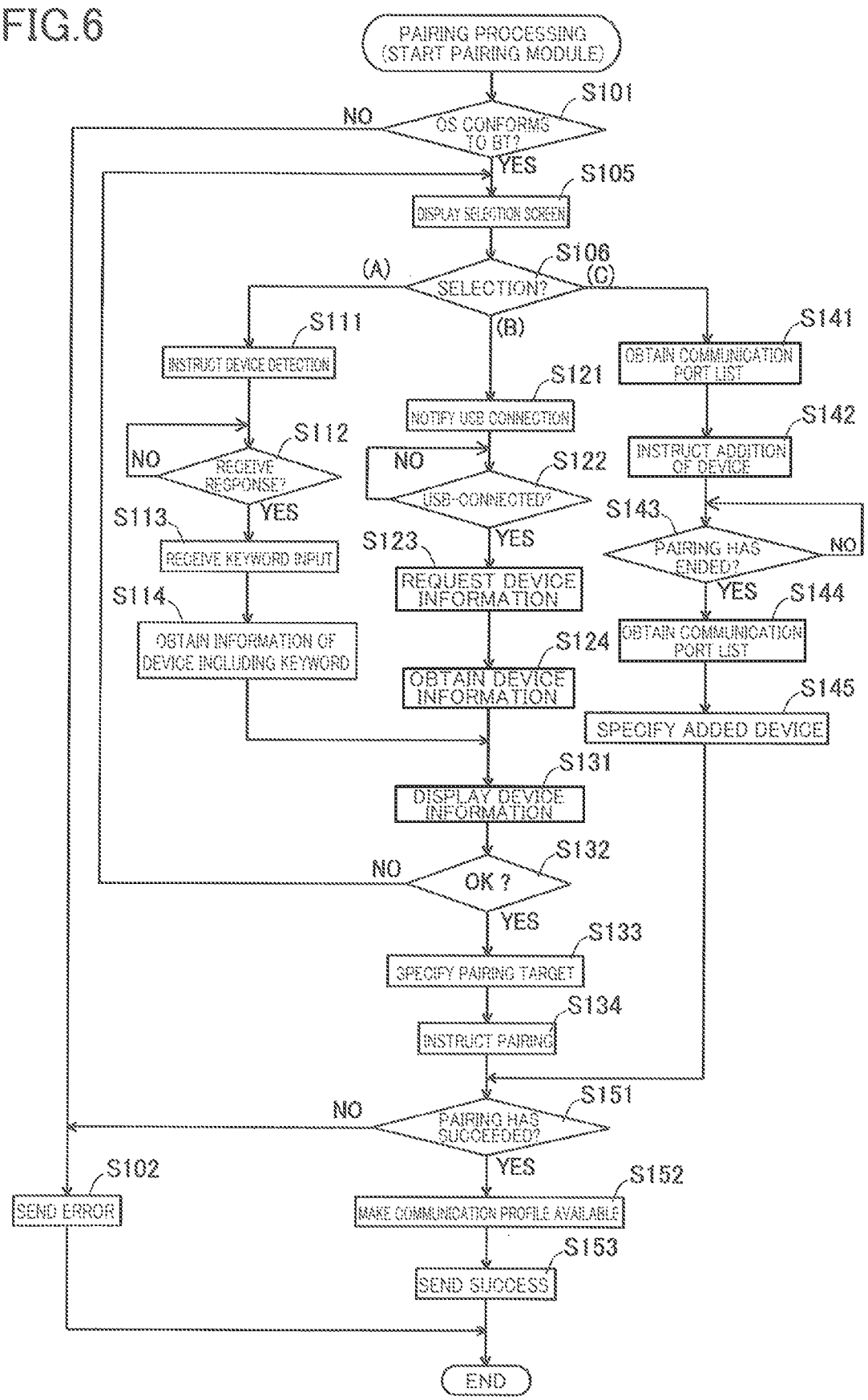
FIG. 6 is a flowchart illustrating a procedure of pairing processing.

Hereinafter, the procedure of pairing processing will be explained with reference to the flowchart of FIG. 6. The pairing processing is executed by the CPU 11 of the PC 1 when the pairing module 422 is started by the installer 420 which instructs the pairing module 422 to execute the pairing processing (A3 of FIG. 5) in the PC 1. The execution instruction of the pairing processing by the installer 420 is an example of an establishing instruction for establishing the BT communication.

In the pairing processing, the CPU 11 first determines whether the OS 41 conforms to the BT communication or not (S101). For example, there is a case where the OS does not conform to the BT communication in the PC used as a server because the PC 1 is not provided with the BT-IF 141, the PC 1 does not have the program for BT communication, or due to some reasons. When it is determined that the OS 41 does not conform to the BT communication (S101: NO), the CPU 11 passes, to the installer 420, information indicating that the pairing is not capable of being executed, namely, information indicating that the pairing has failed (S102, B8 of FIG. 5), and ends the pairing processing.

Figure 7:
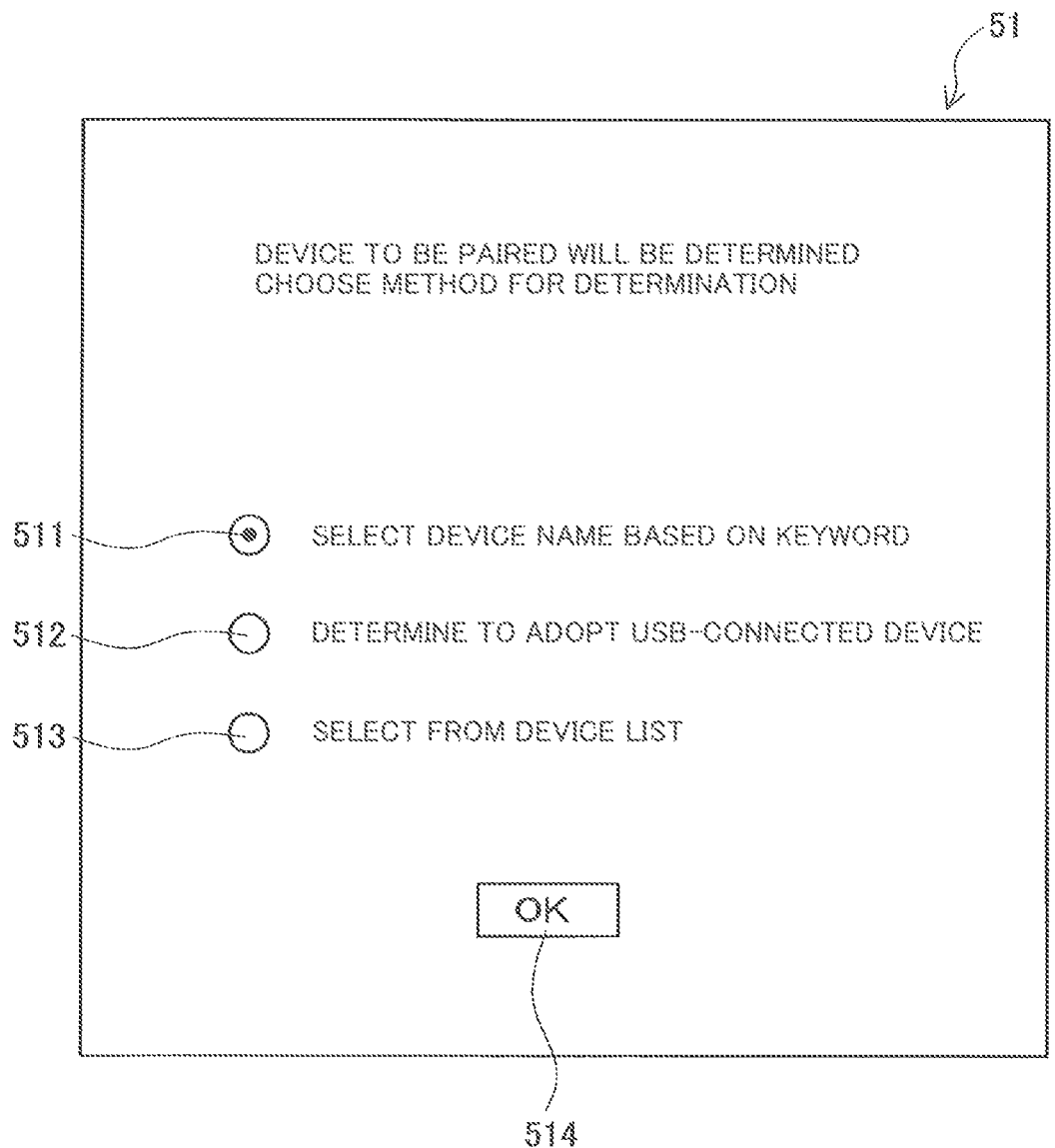
FIG. 7 is an explanatory view illustrating an example of a selection screen for a pairing method.

When it is determined that the OS 41 conforms to the BT communication (S101: YES), the CPU 11 causes the user IF 13 to display a selection screen displaying choices of pairing methods (S105, B1 of FIG. 5). The pairing module 422 according to the embodiment is capable of executing three kinds of methods: (A) searching for the device name by a keyword, (B) specification of the device by USB connection, and (C) user's selection from the device list. One of them is executed in accordance with user's selection, thereby determining the device to be paired. The selection screen displayed at S105 is a display screen for receiving one selection from three kinds of methods for determining the device to be paired. The CPU 11 causes the user IF 13 to display, for example, a selection screen 51 including radio buttons 511, 512 and 513 of three choices, and an OK button 514 as illustrated in FIG. 7.

The CPU 11 receives one selection of (A) to (C) according to a state of the radio buttons when the OK button 514 is operated on the displayed selection screen by the user (S106, B2 of FIG. 5). Information received at S106, namely, information indicating any one of (A) to (C) is an example of first specifying information or second specifying information. Then, in the pairing processing according to the embodiment, the setup procedure executed before the BT communication is established differs from each other according to the user's selection. That is, for example, the setup procedure executed before the BT communication is established in a case where the selection (A) as the first specifying information is received differs from the setup procedure executed before the BT communication is established in a case where the selection (B) as the second specifying information is received.

When it is determined that the selection received on the selection screen 51 is (A), that is searching for the device name by the keyword (S106: (A)), the CPU 11 instructs the OS 41 to search for the device (S111).

The OS 41 transmits a device search signal through the BT-IF 141 in accordance with the instruction at S111. Respective devices existing within a distance in which the BT communication with the PC 1 is available and having received the search signal transmit, to the OS 41, device information including the device ID as information for identifying the device and the BT address as address information used for the BT communication in response to the received search signal. The device ID included in a response signal is an example of device identification information. When the OS 41 receives the response signal, the CPU 11 can obtain information of the response signal from the OS 41. The CPU 11 determines whether the response signal has been received or not (S112).

When it is determined that the response signal has not been received (S112: NO), the CPU 11 waits until the response signal is received. In a case where the CPU 11 does not receive the information of the response signal until a predetermined time elapses after passing the instruction for transmitting the search signal to the OS 41, the CPU 11 may determine time-out and proceed to S102, where the CPU 11 may end the pairing processing.

When it is determined that the response signal has been received (S112: YES), the CPU 11 receives input of a keyword (S113). The CPU 11 displays, for example, an input box for the keyword to receive input of the device ID, the device name, part of them, or the like. Then, the CPU 11 obtains information of the device ID or the like included in the received information of the response signal from the OS 41 and tries to make a search with respect to the obtained information by the inputted keyword. Then, the CPU 11 obtains device information of a device in which information corresponding to the keyword is included in the information of the response signal (S114). S114 is an example of obtaining processing. The procedure from S111 to S114 is an example of a first procedure. When a device in which information corresponding to the keyword is included is not searched, the CPU 11 may receive input of the keyword again by the user or may allow the OS 41 to search devices again.

When it is determined that the selection received on the selection screen 51 is (B) specification of the device by USB connection (S106: (B)), the CPU 11 notifies that the printer 2 is connected to the PC 1 by wired connection in the USB mode (S121). S121 is an example of notification processing. Then, the CPU 11 determines whether the device is USB-connected to the PC 1 or not after the execution of notification (S122). When the device is connected to the USB-IF 142, PnP (an abbreviation of Plug and Play) generates, and the CPU 11 is able to communicate with the USB-connected device. When it is determined that the device is not USB-connected (S122: NO), the CPU 11 waits until the device is USB-connected.

When it is determined that the device is USB-connected (S122: YES), the CPU 11 requests the printer 2 as the USB-connected device to transmit device information by USB communication (S123). The CPU 11 passes, to the printer 2, an instruction for causing the printer to transmit, for example, the device ID and the BT address as device information. The device information is an example of connection information. Then, the CPU 11 obtains the device information from the printer 2 by wired communication through the USB-IF 142 (S124). S124 is an example of obtaining processing and an example of connection-information obtaining processing. The procedure from S121 to S124 is an example of a second procedure.

After the device information is obtained at S114 or S124, the CPU 11 causes the user IF 13 to display the obtained device information which is, for example, the device ID and the device name (S131), and the CPU 11 receives confirmation of the device by the user. Then, the CPU 11 determines whether the confirmation by the user has been received or not (S132). When it is determined that the confirmation by the user has not been received (S132: NO), the CPU 11 returns to S105 and receives selection of the pairing method again.

When it is determined that confirmation by the user has been received (S132: YES), the CPU 11 specifies the device indicated by the displayed device information as the device to be paired (S133). S133 is an example of specifying processing. The device specified at S133 is an example of a particular device. Then, the CPU 11 passes the device information of the device specified as the device to be paired and the instruction for executing pairing to the OS 41 (S134, B4 of FIG. 5). S134 is an example of instruction processing. Accordingly, the OS 41 executes the BT communication with the specified device and executes pairing (B5 of FIG. 5).

On the other hand, when it is determined that the selection received on the selection screen 51 is (C) user's selection from the device list (S106: (C)), the CPU 11 obtains information of the communication port list 44 from the OS 41 (S141). The OS 41 according to the embodiment has a function of sending information of the communication port list 44, namely, information of respective communication ports and devices associated with the communication ports in accordance with a request. The CPU 11 obtains information of all communication ports, of the plurality of communication ports, in which associating devices have been registered based on the information obtained from the OS 41, and the CPU 11 stores the information in the memory 12 as temporary information.

Then, the CPU 11 passes an instruction for adding the device to the OS 41 (S142, B4 of FIG. 5). The instruction for adding the device is an instruction for causing the OS 41 to search for surrounding new devices, causing the user to select the searched device to be added, and allowing the OS 41 to execute pairing with the selected device.

When receiving the instruction for adding the device, the OS 41 searches for devices and receives response signals from surrounding devices to obtain information of devices which have transmitted response signals. The OS 41 causes the user IF 13 to display a list of the obtained information and receives selection by the user from the displayed list to specify the device to be paired. The OS 41 further executes pairing with the specified device. A series of processing by the OS 41 executed in response to receipt of the instruction for adding the device at S142 corresponds to examples of obtaining processing, specifying processing, and instruction processing. Accordingly, the OS 41 executes the BT communication with the specified device to thereby execute pairing (B5 of FIG. 5). The procedure of S142 and the pairing executed by the OS 41 in response to the instruction for adding the device is an example of a third procedure.

After passing the instruction for adding the device to the OS 41, the CPU 11 determines whether the processing of pairing by the OS 41 has ended or not (S143). When it is determined that the processing has not ended (S143: NO), the CPU 11 waits until the processing ends. The CPU 11 determines that the processing of pairing by the OS 41 has ended, for example, when the selection screen for the devices displayed by the OS 41 is closed. When information indicating the end of pairing can be obtained from the OS 41, the CPU 11 may make determination at S143 based on the information.

When it is determined that the processing of pairing by the OS 41 has ended (S143: YES), the CPU 11 obtains the information of the communication port list 44 from the OS 41 again (S144). S144 is the same processing as S141. Information of the device in which pairing has been newly executed by the instruction for adding the device is added to the information obtained at S144 as compared with information obtained at S141. The CPU 11 compares the information obtained at S144 with the information obtained and stored at S141 to specify the added device (S145). If the OS 41 has the function of sending information of the communication port in which pairing has been newly executed, the CPU 11 can specify the device by using the function instead of executing S141, S144 and S145.

The CPU 11 determines whether the pairing has succeeded or not after S134 or S145 (S151). For example, after passing the instruction of S134, the CPU 11 obtains information indicating success/or failure of the pairing from the OS 41. The CPU 11 may determine whether the device designated as a target for pairing is registered or not by referring to the BT device DB 43. The CPU 11 also determines whether the pairing has succeeded or not based on whether the device has been specified at S145, namely, based on whether there exists an added device or not.

When it is determined that the pairing has not succeeded (S151: NO), the CPU 11 proceeds to S102 and passes the information indicating that the pairing has failed to the installer 420 (B8 of FIG. 5) to end the pairing processing. The OS 41 does not succeed in pairing, for example, in a case where at least one of the BT-IF 141 of the PC 1 and the BT-IF 21 of the printer 2 does not work normally or in a case where the distance between the PC 1 and the printer 2 is far.

When it is determined that the pairing has succeeded (S151: YES), the CPU 11 passes, to the OS 41, an instruction for making a communication profile to which the printer 2 conforms, which is, for example, SPP available (S152). When the printer 2 conforms also to HCRP, the CPU 11 passes an instruction for enabling HCRP to the OS 41. S152 is an example of making-available processing. SPP and HCRP are examples of particular profiles. The pairing module 422 has information of communication profiles to which respective models of the printer 2 conform. The pairing module 422 may receive information of communication profiles from the installer 420 at the time of starting.

The OS 41 obtains information of the communication profile to which the printer 2 conforms from the printer 2 at the middle of execution of pairing and sets the obtained communication profile to be available at the time of registering device information in the BT device DB 43. For example, "BT service" illustrated in FIG. 2A indicates information of an available communication profile. For example, when information of SPP can be obtained as information of the communication profile, the OS 41 sets SPP to be available. When the printer 2 conforms to further another communication profile, the OS 41 also obtains information of said another communication profile and sets the communication profile to be available. Then, the OS 41 allocates the communication port corresponding to the available communication profile to the printer 2 and registers the communication port in the communication port list 44 (B6 of FIG. 5).

However, it may take time to receive information of the communication profile due to compatibility or the like between the BT-IF 141 of the PC 1 and the BT-IF 21 of the printer 2. In that case, the OS 41 in which a time-out period of completion of pairing is set may end the pairing due to time-out without making the communication profile, which is originally available, available. In a case where the pairing is ended due to time-out, device information not including information of the available communication profile is registered in the BT device DB 43 as information of the printer 2. In that case, registration of the communication port corresponding to the printer 2 is not executed. Even in this case, the printer 2 is registered in the BT device DB 43, and the OS 41 sends information indicating that the pairing has succeeded.

When the instruction for making the communication profile to which the printer 2 conforms available is received at S152, the OS 41 updates device information registered in the BT device DB 43 and makes the designated communication profile available. As a result, device information including information of the communication profile is registered in the BT device DB 43 as illustrated in FIG. 2A, and the communication port for the printer 2 is certainly registered in the communication port list 44 (B6 of FIG. 5).

Then, the CPU 11 passes the information indicating that the pairing has succeeded to the installer 420 (S153, B7 of FIG. 5) and ends the pairing processing. The installer 420 makes determination illustrated at A10 of FIG. 5 based on information transmitted from the pairing module 422 at S102 or at S153.

The installer 420 instructs the setup module 423 to execute the setup processing when information received from the pairing module 422 is the information indicating the success of the pairing. Next, the procedure of the setup processing as processing by the setup module 423 will be explained with reference to the flowchart of FIG. 8. The setup processing is executed by the CPU 11 of the PC 1 when the setup module 423 is started by the installer 420 which instructs the setup module 423 to execute the setup processing (A11 of FIG. 5) in the PC 1.

In the setup processing, the CPU 11 receives designation of one communication profile, to be used, of the communication profiles to which the printer 2 conforms by a user's operation (S201). The setup module 423 receives information of the communication profiles to which the printer 2 conforms, for example, from the installer 420 at the time of starting.

Then, the CPU 11 determines whether SPP has been selected or not (S202). In a case where the communication profile to which the printer 2 is conformable is only SPP, it is not necessary to receive the user's operation at S201, and the CPU 11 just determines to use SPP as the communication profile.

When it is determined that SPP has been selected (S202: YES), the CPU 11 receives selection of the communication port associated with the printer 2 by a user's operation (S203, C3 of FIG. 5). The CPU 11 obtains, for example, information of communication ports registered in the communication port list 44 (C1 of FIG. 5), and causes the user IF 13 to display the communication ports in a list (C2 of FIG. 5). It is preferable that the CPU 11 disposes the communication ports in the list in a mode in which the communication port corresponding to the printer 2 which has been newly paired is easily selected such as displaying at the top of the displayed list or displaying with emphasis.

Then, the CPU 11 determines whether there exists a print port corresponding to the selected communication port or not (S204). In the OS 41, the print port list 45 containing ports with the same names as the ports in the communication port list 44 is provided separately from the communication port list 44. When all COM ports prepared in advance have been respectively associated with devices, and the OS 41 receives the instruction for further adding an additional device, the OS 41 may add a new COM port and associate the additional device with the newly added COM port. Moreover, there is a case where the newly added COM port is not reflected on the print port list 45 immediately though the newly added COM port is added into the communication port list 44 as the communication port. In the case of such OS 41, there is a risk that a print port corresponding to the newly added COM port does not exist when the selected communication port is the added COM port.

When it is determined that the print port exists (S204: YES), the CPU 11 instructs the OS 41 to create a print queue corresponding to the print port and to resister the installed printer driver 421 so as to be associated with the created print queue (S205, C4 of FIG. 5). Accordingly, the print queue for BT communication based on SPP is created, and the printer driver 421 is associated with the print port through the print queue.

When it is determined that the print port does not exist (S204: NO), the CPU 11 makes notification for prompting restart of the OS 41 (S206). When the OS 41 or the spooler 411 is restarted in the case where the COM port is added, the spooler 411 reconfigures the print port list 45 based on the communication port list 44 at the time of starting. Then, the print port corresponding to the added COM port is provided in the print port list 45; therefore, the creation of the print queue and the registration of the printer driver 421 can be executed. The possibility of completing the setup is increased by notifying the restart.

On the other hand, when it is determined that HCRP has been selected as the communication profile (S202: NO), the CPU 11 executes processing corresponding to HCRP (S207). In the case of HCRP, most of processing for setting the communication port is executed by the OS 41. The CPU 11 ends the setup processing after any of S205, S206 or S207.

As described above in detail, the install package 42 according to the embodiment includes the installer 420, the pairing module 422, and the setup module 423, and the installer 420 causes the pairing module 422 to execute respective processing of specification of the device and establishment of wireless communication with the device which is necessary for the PC 1 to execute wireless communication with the printer 2. As the pairing module 422 is prepared separately from the installer 420, it is not necessary to prepare processing of pairing in the installer 420 and the design load for the installer 420 is reduced.

Additionally, three kinds of pairing methods are prepared to be selected in the pairing module 422 according to the embodiment. For example, the number of devices can be narrowed down by the keyword in (A); therefore, the device can be easily specified. Moreover, the device to be paired is specified based on the keyword designated by the user; therefore, reliability of the device to be connected is high. For example, the devices can be specified by wired connection of USB in (B); therefore, the device can be easily specified. Moreover, the device which is currently wire-connected is specified as the device to be paired; therefore, reliability of the device to be connected is high. Furthermore, the device automatically recognized by wired connection is specified after the USB connection is notified; therefore, a possibility of selecting a wrong connection target can be reduced. For example, the function of OS is utilized in (C); therefore, the design load can be further reduced.

Since the selection is received from three kinds of pairing methods in the embodiment, establishment of wireless communication by the procedure suitable for the execution status of the installer 420 can be expected. For example, in environment where a number of BT devices are searched, the connection target can be easily selected when selection targets can be reduced by the procedure of (A). In environment where the user is assumed to be present close to the printer 2 to be connected, the printer 2 is directly USB-connected to the PC 1 by the procedure of (B), thereby reducing the risk of selecting a wrong target. In a case where it is difficult to assume use environment, the selection is entrusted to the OS by the procedure of (C), which allows the user to establish wireless communication by a general-purpose UI provided by the OS.

There is a case where the OS automatically enables wireless communication based on the particular communication profile at the time of executing pairing, and there is also a case where the wireless communication is not enabled due to a failure of a driver for BT communication or the like. In the embodiment, the pairing module 422 enables wireless communication based on the communication profile to which the printer 2 conforms when the pairing by the BT communication succeeds; therefore, the possibility that the printer driver 421 can complete setup for executing wireless communication with the printer 2 by the communication profile is increased.

Furthermore, the pairing module 422 and the setup module 423 are prepared as separate modules in the embodiment. Maintenance of respective modules becomes easy by preparing them as separate modules. For example, when modification occurs due to change of terms in BT communication, modification of the setup module 423 is not necessary as long as the pairing module 422 is modified. Moreover, when only the processing of one module is desired to be used, it is easy to apply the module. Furthermore, since the modules are separate from each other, an execution file containing only one module can be creased, and respective files can be operated in separate processes.

The embodiment is merely an example, and does not limit the present invention at all. Therefore, various modifications and alterations may naturally occur in the technique disclosed in the specification within a scope not departing from the gist thereof. For example, the device is not limited to the printer as long as the device communicates with the PC 1 by using programs, which may be a multifunction device, a FAX machine, or a scanner. Additionally, the numbers of PCs and devices, various data configurations and the like are not limited to illustrated examples.

Although the pairing module 422 has three kinds of procedures in the embodiment, the procedures are not limited to this. It is also preferable that two kinds of them are provided or that any one kind of procedure is provided. The procedure to be executed is determined by the user's selection in the above explanation; however, the CPU 11 may determine the procedure, for example, according to the model.

The printer 2 has the USB-IF in the embodiment; however, it is not always necessary to have the USB-IF. It is also preferable that the pairing module 422 determines whether the printer 2 has the USB-IF or not, for example, based on model information, and when it is determined that the printer 2 does not have the USB-IF, the pairing module 422 may display the choice (B) on the selection screen 51 in an unselectable mode.

Also in the embodiment, after the device information is obtained by searching with the keyword or by the USB connection, user's confirmation is received by displaying the device information; however, it is not always necessary to execute the above processing. For example, S131 and S132 in the pairing processing may be omitted and the process proceeds to S133 after S114 or S124. Moreover, the procedure of the pairing is selected again when the confirmation by the user is not obtained in the above embodiment; however, it is also preferable that the process returns to S111 or S121 and that the same processing is executed again, or that the process proceeds to S102 to end the pairing processing.

In arbitrary flowcharts disclosed in the embodiment, a plurality of processing in a plurality of arbitrary steps may be arbitrarily changed in the execution order or may be executed in parallel in a range not causing discrepancy in the processing contents.

The processing disclosed in embodiments may be executed by a single CPU, a plurality of CPUs, hardware such as ASIC or combinations of them. The processing disclosed in the embodiments may be realized in various states such as a recording medium recording programs or methods for executing the processing.

What is claimed is:

1. A non-transitory storage medium storing a program readable by a computer of an information processing apparatus,
    wherein, when executed by the computer, the program causes the information processing apparatus to execute:
        in response to receipt of an establishing instruction, obtaining processing of obtaining device information of at least one connectable device which is a device capable of connecting to the information processing apparatus, the establishing instruction being an instruction for establishing wireless communication based on a prescribed wireless communication protocol from software incorporated in the information processing apparatus, the at least one connectable device being capable of establishing wireless communication based on the prescribed wireless communication protocol,
        specifying processing of specifying a particular device, of the at least one connectable device, to which the wireless communication is established based on the obtained device information, and
        instruction processing of instructing an operating system of the information processing apparatus to execute pairing with the particular device, the operating system establishing the wireless communication based on the prescribed wireless communication protocol with the particular device in response to receipt of an instruction for the pairing, the operating system associating the particular device with one of a plurality of communication ports provided in the operating system for respectively communicating with a plurality of devices through a communication interface of the information processing apparatus in response to establishment of the wireless communication with the particular device.

2. The non-transitory storage medium according to claim 1,
    wherein, when executed by the computer, the program causes the information processing apparatus to:
        in response to receipt of the establishing instruction, obtain, from the operating system, identification information of the at least one connectable device as the device information in the obtaining processing, the operating system being capable of obtaining the identification information of the at least one connectable device from the at least one connectable device, and
        in the specifying processing, (a) receive a keyword through a user interface of the information processing apparatus and (b) specify one of the at least one connectable device as the particular device based on the identification information of the at least one connectable device obtained in the obtaining processing, the identification information of the specified device including the received keyword.

3. The non-transitory storage medium according to claim 1,
    wherein, when executed by the computer, the program causes the information processing apparatus to:
        further execute connection-information obtaining processing of obtaining, by wired communication, connection information for establishing wireless communication from the device to be established wireless communication,
        in the specifying processing, specify one of a plurality of devices wired-connected to the information processing apparatus as the particular device for establishing the wireless communication, and,
        in the instruction processing, instruct the operating system to execute pairing with the particular device by using the obtained connection information, the operating system establishing the wireless communication with the particular device by using the connection information.

4. The non-transitory storage medium according to claim 1,
    wherein, when executed by the computer, the program causes the information processing apparatus to:
        in response to receipt of the establishing instruction, further execute notification processing of causing the user interface of the information processing to notify information prompting a user to connect a device, to be established wireless communication, to the information processing apparatus by wired communication,
in the obtaining processing which is executed after execution of the notification processing, obtain identification information of the device wired-connected to the information processing apparatus from the operating system as the device information of the at least one connectable device, and
in the specifying processing, specify the device wired-connected to the information processing apparatus as the particular device.

5. The non-transitory storage medium according to claim 1,
wherein, when executed by the computer, the program causes the information processing apparatus to execute the obtaining processing, the specifying processing and the instruction processing by instructing the operating system to add an additional device as a device to be established wireless communication, the operating system obtaining the device information of the at least one connectable device in response to receipt of the instruction for adding the device, the operating system receiving selection of the added device from the obtained device information through the user interface of the information processing apparatus, and the operating system specifying the selected device as the particular device to thereby establish the wireless communication with the particular device.

6. The non-transitory storage medium according to claim 1,
wherein, when executed by the computer, the program causes the information processing apparatus to, in response to receipt of first specifying information or second specifying information for establishing wireless communication based on the prescribed wireless communication protocol, execute the obtaining processing, the specifying processing, and the instruction processing, a first procedure as a procedure for establishing the wireless communication executed when the first specifying information is received differing from a second procedure as a procedure for establishing the wireless communication executed when the second specifying information is received.

7. The non-transitory storage medium according to claim 6,
wherein a procedure for establishing the wireless communication by the program is at least one of the first procedure, the second procedure, and a third procedure,
when the first procedure is executed as the procedure for establishing the wireless communication, the program causes the information processing apparatus to:
in the obtaining processing, obtain, from the operating system, identification information of the at least one connectable device as the device information, the operating system being capable of obtaining the identification information of the at least one connectable device from the at least one connectable device, and
in the specifying processing, (a) receive a keyword through a user interface of the information processing apparatus, and (b) specify one of the at least one connectable device as the particular device based on the identification information of the at least one connectable device obtained in the obtaining processing, the identification information of the specified device including the received keyword,
when the second procedure is executed as the procedure for establishing the wireless communication, the program causes the information processing apparatus to:
further execute connection-information obtaining processing of obtaining, by wired communication, connection information for establishing wireless communication from the device to be established wireless communication,
in the specifying processing, specify one of a plurality of devices wired-connected to the information processing apparatus as the particular device for establishing the wireless communication, and
in the instruction processing, instruct the operating system to execute pairing with the particular device by using the obtained connection information, the operating system establishing the wireless communication with the particular device by using the connection information, and
when the third procedure is executed as the procedure for establishing the wireless communication, the program causes the information processing apparatus to execute the obtaining processing, the specifying processing and the instruction processing by instructing the operating system to add an additional device as a device to be established wireless communication, the operating system obtaining the device information of the at least one connectable device in response to receipt of the instruction for adding the device, the obtaining system receiving selection of the added device from the obtained device information through the user interface of the information processing apparatus, and the operating system specifying the selected device as the particular device to thereby establish the wireless communication with the particular device.

8. The non-transitory storage medium according to claim 1,
wherein, when executed by the computer, the program causes the information processing apparatus to execute making-available processing of instructing the operating system to make wireless communication based on a particular profile as one of profiles available in the prescribed wireless communication protocol in response to success in establishment of the wireless communication with the particular device after the instruction processing, the operating system writing that wireless communication based on the particular profile is available in information of the particular device in response to receipt of the instruction for making wireless communication available based on the particular profile, the operating system not associating the particular device with any one of the plurality of communication ports when an availability of wireless communication based on the particular profile is not written in the information of the particular device registered in the operating system.

9. A non-transitory storage medium storing a program set readable by a computer of an information processing apparatus, the program set including a first module and a second module,
wherein, when executed by the computer, the first module causes the information processing apparatus to execute:
in response to receipt of an establishing instruction, obtaining processing of obtaining device information of at least one connectable device which is a device capable of connecting to the information processing apparatus, the establishing instruction being an instruction for establishing wireless communication based on a prescribed wireless communication protocol from software incorporated in the information processing apparatus, the at least one connectable device being capable of establishing wireless communication based on the prescribed wireless communication protocol, specifying processing of specifying a particular device, of the at least one connectable device, to which the wireless communication is established based on the obtained device information, and instruction processing of instructing an operating system of the information processing apparatus to execute pairing with the particular device, the operating system establishing the wireless communication based on the prescribed wireless communication protocol with the particular device in response to receipt of an instruction for the pairing, the operating system associating the particular device with one of a plurality of communication ports provided in the operating system for respectively communicating with a plurality of devices through a communication interface of the information processing apparatus in response to establishment of the wireless communication with the particular device, and when executed by the computer, the second module causes the information processing apparatus to execute setup processing of creating a device queue for the information processing apparatus that communicates with the particular device, the created device queue being associated with a particular port as a communication port associated with the particular device, the information processing apparatus communicating with the particular device by using the device queue.

10. An information processing apparatus comprising:
a communication interface; and
a computer,
wherein the computer executes:
in response to receipt of an establishing instruction, obtaining processing of obtaining device information of at least one connectable device which is a device capable of connecting to the information processing apparatus, the establishing instruction being an instruction for establishing wireless communication based on a prescribed wireless communication protocol from software incorporated in the information processing apparatus, the at least one connectable device being capable of establishing wireless communication based on the prescribed wireless communication protocol, specifying processing of specifying a particular device, of the at least one connectable device, to which the wireless communication is established based on the obtained device information, and instruction processing of instructing an operating system of the information processing apparatus to execute pairing with the particular device, the operating system establishing the wireless communication based on the prescribed wireless communication protocol with the particular device in response to receipt of an instruction for the pairing, the operating system associating the particular device with one of a plurality of communication ports provided in the operating system for respectively communicating with a plurality of devices through a communication interface of the information processing apparatus in response to establishment of the wireless communication with the particular device.

\* \* \* \* \*